US012739855B2

(12) United States Patent
Yuan et al.

(10) Patent No.: US 12,739,855 B2
(45) Date of Patent: Sep. 15, 2026

(54) MULTI PHYSICAL UPLINK SHARED CHANNEL (PUSCH) SCHEDULING FOR MULTIPLE TRANSMISSION RECEPTION POINTS (M-TRP)

(71) Applicant: QUALCOMM Incorporated, San Diego, CA (US)

(72) Inventors: Fang Yuan, Beijing (CN); Wooseok Nam, San Diego, CA (US); Yan Zhou, San Diego, CA (US); Mostafa Khoshnevisan, San Diego, CA (US); Tao Luo, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 297 days.

(21) Appl. No.: 18/575,251

(22) PCT Filed: Sep. 2, 2021

(86) PCT No.: PCT/CN2021/116106
§ 371 (c)(1),
(2) Date: Dec. 28, 2023

(87) PCT Pub. No.: WO2023/028930
PCT Pub. Date: Mar. 9, 2023

(65) Prior Publication Data

US 2024/0314806 A1 Sep. 19, 2024

(51) Int. Cl.
*H04W 72/232* (2023.01)
*H04L 5/00* (2006.01)

(52) U.S. Cl.
CPC ......... *H04W 72/232* (2023.01); *H04L 5/0023* (2013.01); *H04L 5/0035* (2013.01)

(58) Field of Classification Search
CPC ............ H04W 72/232; H04W 72/1268; H04L 5/0023; H04L 5/0035; H04L 5/0053
See application file for complete search history.

(56) References Cited

U.S. PATENT DOCUMENTS

2020/0205149 A1 6/2020 Khoshnevisan et al.
2021/0307070 A1* 9/2021 Kim .................... H04L 25/0226
(Continued)

FOREIGN PATENT DOCUMENTS

| | | | |
|---|---|---|---|
| CN | 111435875 | A | 7/2020 |
| EP | 3864790 | A1 | 8/2021 |
| WO | 2020201995 | A1 | 10/2020 |

OTHER PUBLICATIONS

Ericsson: "On PUCCH and PUSCH Enhancements for Multi-TRP", 3GPP TSG-RAN WG1 Meeting #105-e, R1-2105808, eMeeting, May 10-27, 2021, pp. 1-13, The whole document.
(Continued)

*Primary Examiner* — Afshawn M Towfighi
(74) *Attorney, Agent, or Firm* — Patterson & Sheridan LLP

(57) ABSTRACT

Certain aspects of the present disclosure provide a technique for wireless communications by a user equipment (UE). The UE receives a downlink control information (DCI) that schedules multiple physical uplink shared channels (PUSCHs) and indicates whether each of the PUSCHs is scheduled as a single transmission reception points (S-TRP) or multiple TRP (M-TRP) transmission. The UE transmits each of the PUSCHs to one or more of the TRPs in accordance with information indicated in the DCI.

30 Claims, 12 Drawing Sheets

(56) References Cited

U.S. PATENT DOCUMENTS

| | | | | |
|---|---|---|---|---|
| 2022/0132534 | A1* | 4/2022 | Jang | H04L 1/08 |
| 2022/0278802 | A1* | 9/2022 | Noh | H04B 7/06 |
| 2022/0312337 | A1* | 9/2022 | Lim | H04L 5/0048 |
| 2024/0163900 | A1* | 5/2024 | Davydov | H04B 7/024 |
| 2024/0187172 | A1* | 6/2024 | Davydov | H04L 5/0091 |
| 2024/0235788 | A1* | 7/2024 | Huang | H04L 1/0046 |

OTHER PUBLICATIONS

International Search Report and Written Opinion—PCT/CN2021/116106—ISA/EPO—May 25, 2022.

OPPO: "Discussion on Beam Management for New SCSs", 3GPP TSG RAN WG1 #106-e, R1-2107240, e-Meeting, Aug. 16-27, 2021, 3 Pages, Section 2.

Ericsson: "On PUCCH and PUSCH Enhancements for Multi-TRP", 3GPP TSG-RAN WG1 Meeting #105-e, R1-2105808, 3rd Generation Partnership Project, Mobile Competence Centre, 650, Route Des Lucioles, F-06921 Sophia-Antipolis Cedex, France, vol. RAN WG1, No. eMeeting, May 10, 2021-May 27, 2021, May 12, 2021, 14 Pages, XP052011729, Chapters 2.1.6 and 2.1.7, Chapter 2.2, Dynamic Switching Between S-TRP and M-TRP, D1 Chapter 3. PUSCH repetition over multiple TRPs.

NOKIA., et al., "Enhancements For Multi-TRP URLLC Schemes", 3GPP TSG RAN WG1 #104- bis-e Meeting, R1-2103366, 3rd Generation 12-15 Partnership Project, Mobile Competence Centre, 650, Route Des Lucioles, F-06921 Sophia-Antipolis Cedex, France, vol. RAN WG1, No. e Meeting, Apr. 12, 2021-Apr. 20, 2021, Apr. 6, 2021, 32 Pages, XP051993391, Chapters 2.3 PUSCH Enhancements with Multi-TRP 2.3.1 SRIs and TPMIs Indications, Switching Between M-TRP and S-TRP, and Switching TRP(s) order, Chapters 2.3.4 Multi-TRP CG PUSCH Enhancements, 2.3.4.1, p. 16, Detailed discussion and analysis: codebook-based mode paragraph.

NTT Docomo., et al., "Discussion on MTRP for Reliability", 3GPP TSG RAN WG1 #104bis-e, R1-2103560, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, 20 Pages, XP051993432, Chapter 3. PUSCH repetition over multiple TRPs, p. 8-p. 10.

Supplementary European Search Report—EP21955475.5—Search Authority—The Hague—Mar. 28, 2025.

* cited by examiner

Intra-slot TDM
PUSCH2 (TRP2, TRP1)
FIG. 7A
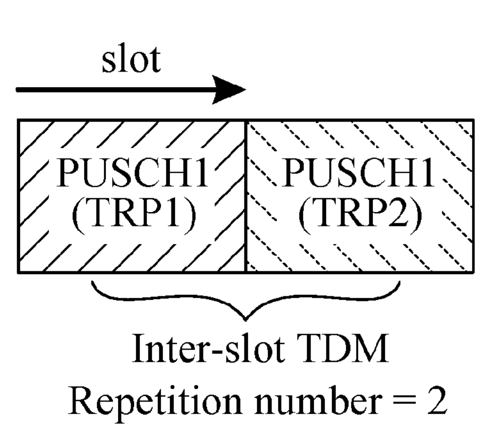
FIG. 7B
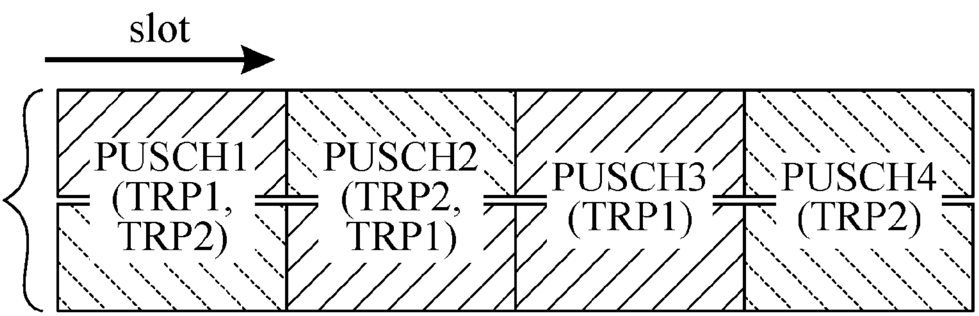
FIG. 7C
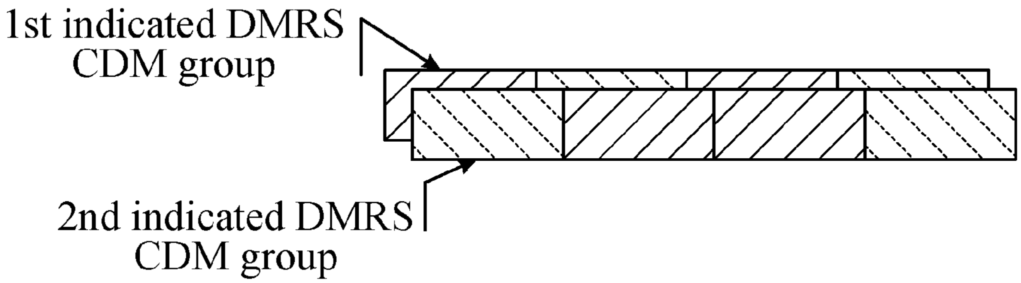
FIG. 7D

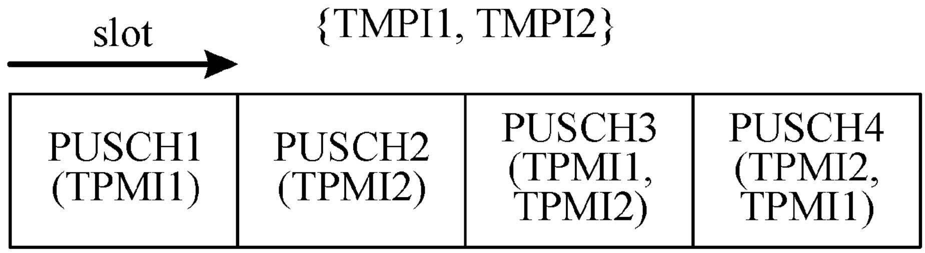
FIG. 8A
slot
{TMPI1, TMPI2}
| PUSCH1 (TPMI1, TPMI2) | PUSCH2 (TPMI1, TPMI2) | PUSCH3 (TPMI1, TPMI2) | PUSCH4 (TPMI1, TPMI2) |
|---|---|---|---|
FIG. 8B
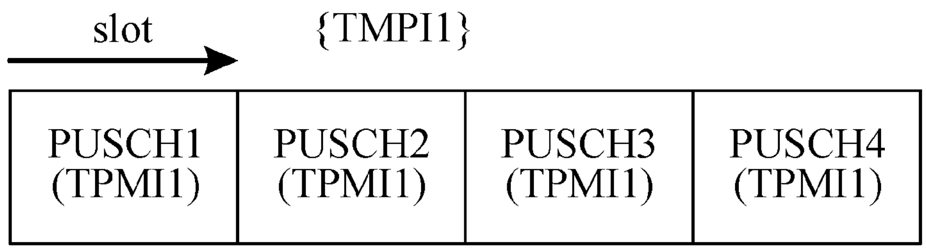
FIG. 8C

MULTI PHYSICAL UPLINK SHARED CHANNEL (PUSCH) SCHEDULING FOR MULTIPLE TRANSMISSION RECEPTION POINTS (M-TRP)

CROSS-REFERENCE TO RELATED APPLICATIONS

This application is a national stage application under 35 U.S.C. 371 of PCT/CN2021/116106, filed Sep. 2, 2021, which is hereby expressly incorporated by reference herein in its entirety as if fully set forth below and for all applicable purposes.

Aspects of the present disclosure relate to wireless communications, and more particularly, to techniques for scheduling physical uplink shared channels (PUSCHs) as single transmission reception points (S-TRP) and multiple TRP (M-TRP) transmissions.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) includes receiving a downlink control information (DCI) that schedules multiple physical uplink shared channels (PUSCHs) and indicates whether each of the PUSCHs is scheduled as a single transmission reception points (S-TRP) or multiple TRP (M-TRP) transmission; and transmitting each of the PUSCHs to one or more of the TRPs in accordance with information indicated in the DCI.

In another aspect, a method for wireless communications by a network entity includes transmitting, to a UE, a DCI that schedules multiple PUSCHs and indicates whether each of the PUSCHs is scheduled as an S-TRP or M-TRP transmission and receiving each of the PUSCHs, via one or more of the TRPs, in accordance with information indicated in the DCI.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 7A depicts example inter-slot time division multiplexing (TDM) scenario, in accordance with certain aspects of the present disclosure.

FIG. 7B depicts example intra-slot TDM scenario, in accordance with certain aspects of the present disclosure.

FIG. 7C depicts example frequency division multiplexing (FDM) scenario, in accordance with certain aspects of the present disclosure.

FIG. 7D depicts example spatial division multiplexing (SDM) scenario, in accordance with certain aspects of the present disclosure.

FIG. 8A depicts one or more transmit precoding matrix indexes (TPMIs) common to all PUSCHs, in accordance with certain aspects of the present disclosure.

FIG. 8B depicts two TPMIs common to all PUSCHs, in accordance with certain aspects of the present disclosure.

FIG. 8C depicts one TPMI common to all PUSCHs, in accordance with certain aspects of the present disclosure.

DETAILED DESCRIPTION

Aspects of the present disclosure provide apparatuses, methods, processing systems, and computer-readable mediums for scheduling single transmission reception points (S-TRP) and/or multiple TRP (M-TRP) transmissions.

For example, a single downlink control information (DCI) may schedule multiple physical uplink shared channels (PUSCHs) as S-TRP transmissions in S-TRP operation and/or M-TRP transmissions in M-TRP operation. The DCI may also indicate information such as a number of scheduled PUSCHs, a number of PUSCH occasions, and/or S-TRP/M-TRP switching bits. Based on the information, a user equipment (UE) transmits the PUSCHs to one or more TRPs.

Introduction to Wireless Communication Networks

Figure 1:
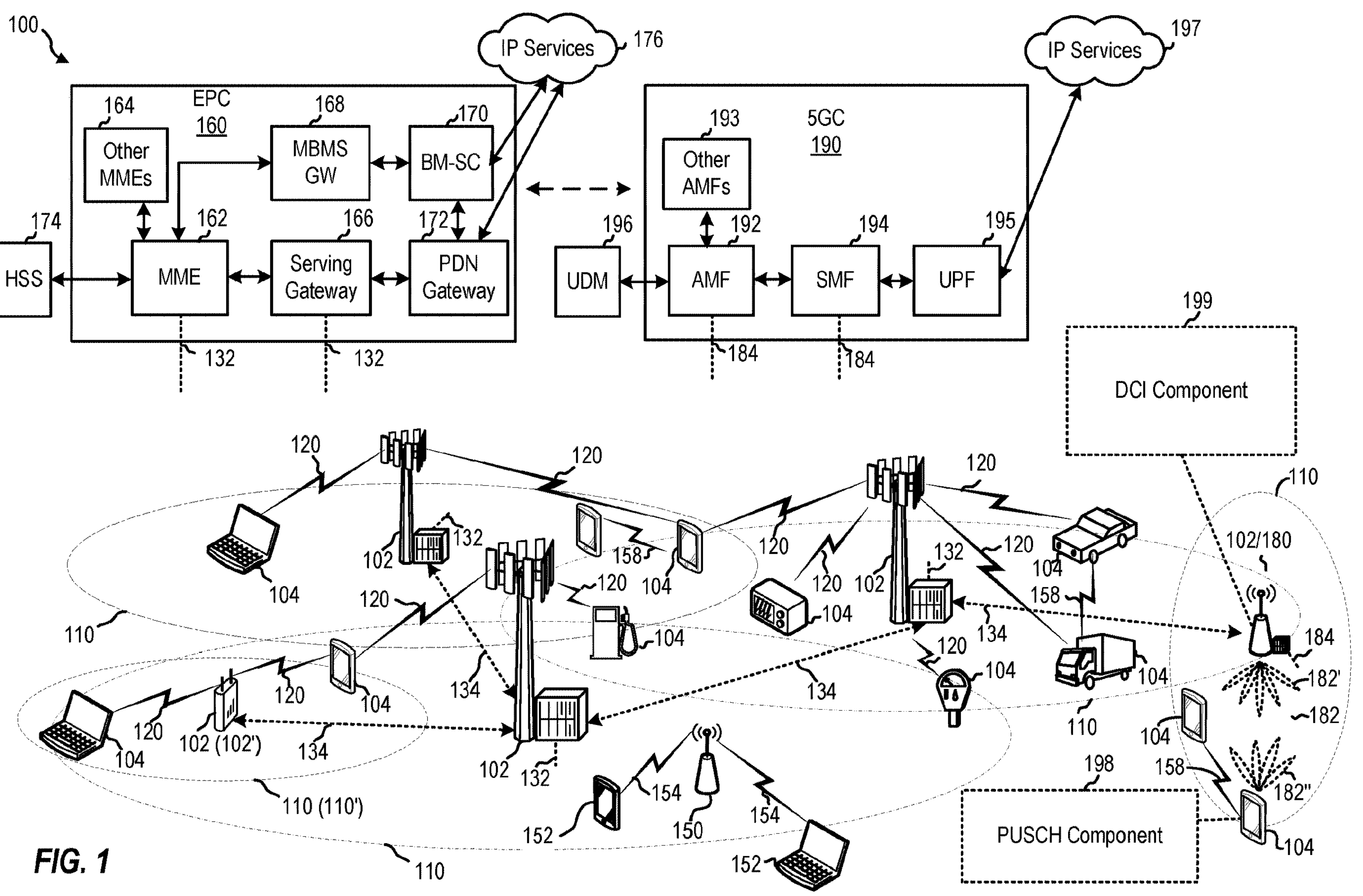
FIG. 1 is a block diagram conceptually illustrating an example wireless communication network.

FIG. 1 depicts an example of a wireless communications system 100, in which aspects described herein may be implemented.

Figure 9:
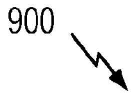
FIG. 9 is a flow diagram illustrating example operations for wireless communications by a UE, in accordance with certain aspects of the present disclosure.
Figure 9:
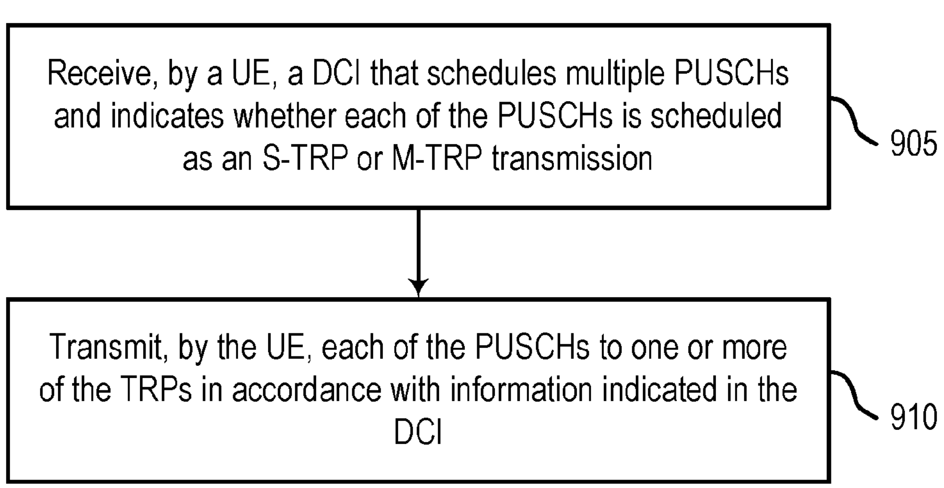
Figure 10:
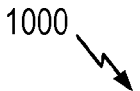
FIG. 10 is a flow diagram illustrating example operations for wireless communications by a network entity, in accordance with certain aspects of the present disclosure.
Figure 10:
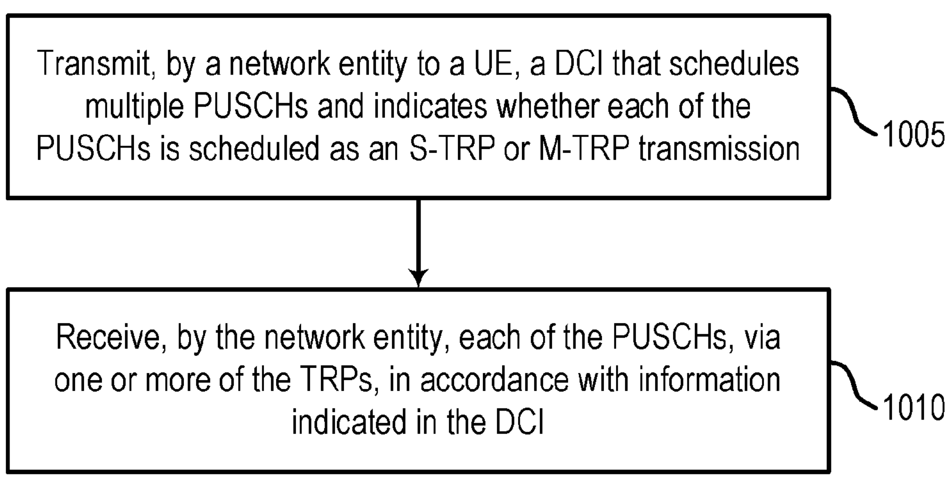

For example, wireless communication network 100 may include a DCI component 199, which may be configured to perform, or cause a base station (BS) 102 to perform method 1000 of FIG. 10. Wireless communication network 100 may also include a PUSCH component 198, which may be configured to perform, or cause a user equipment (UE) 104 to perform method 900 of FIG. 9.

Generally, wireless communications system 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, the BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 2:
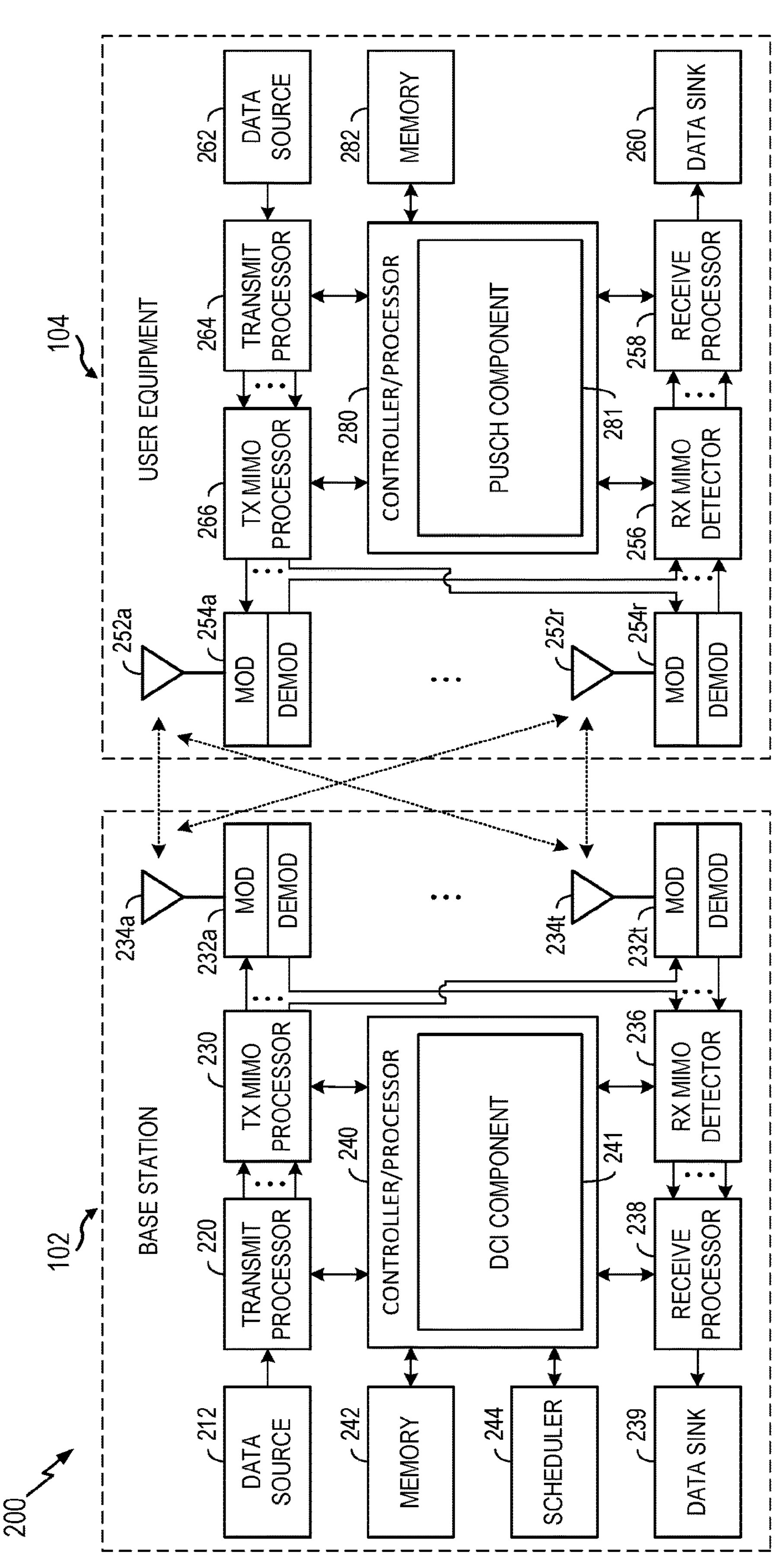
FIG. 2 is a block diagram conceptually illustrating aspects of an example base station (BS) and user equipment (UE).

FIG. 2 depicts aspects of an example BS 102 and a UE 104 (e.g., in wireless communication network 100 of FIG. 1).

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a DCI component 241, which may be representative of a DCI component 199 of FIG. 1. Notably, while depicted as an aspect of controller/processor 240, the DCI component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes a PUSCH component 281, which may be representative of a PUSCH component 198 of FIG. 1. Notably, while depicted as an aspect of controller/processor 280, the PUSCH component 281 may be implemented additionally or alternatively in various other aspects of UE 104 in other implementations.

Figures 3A, 3B, 3C, 3D:
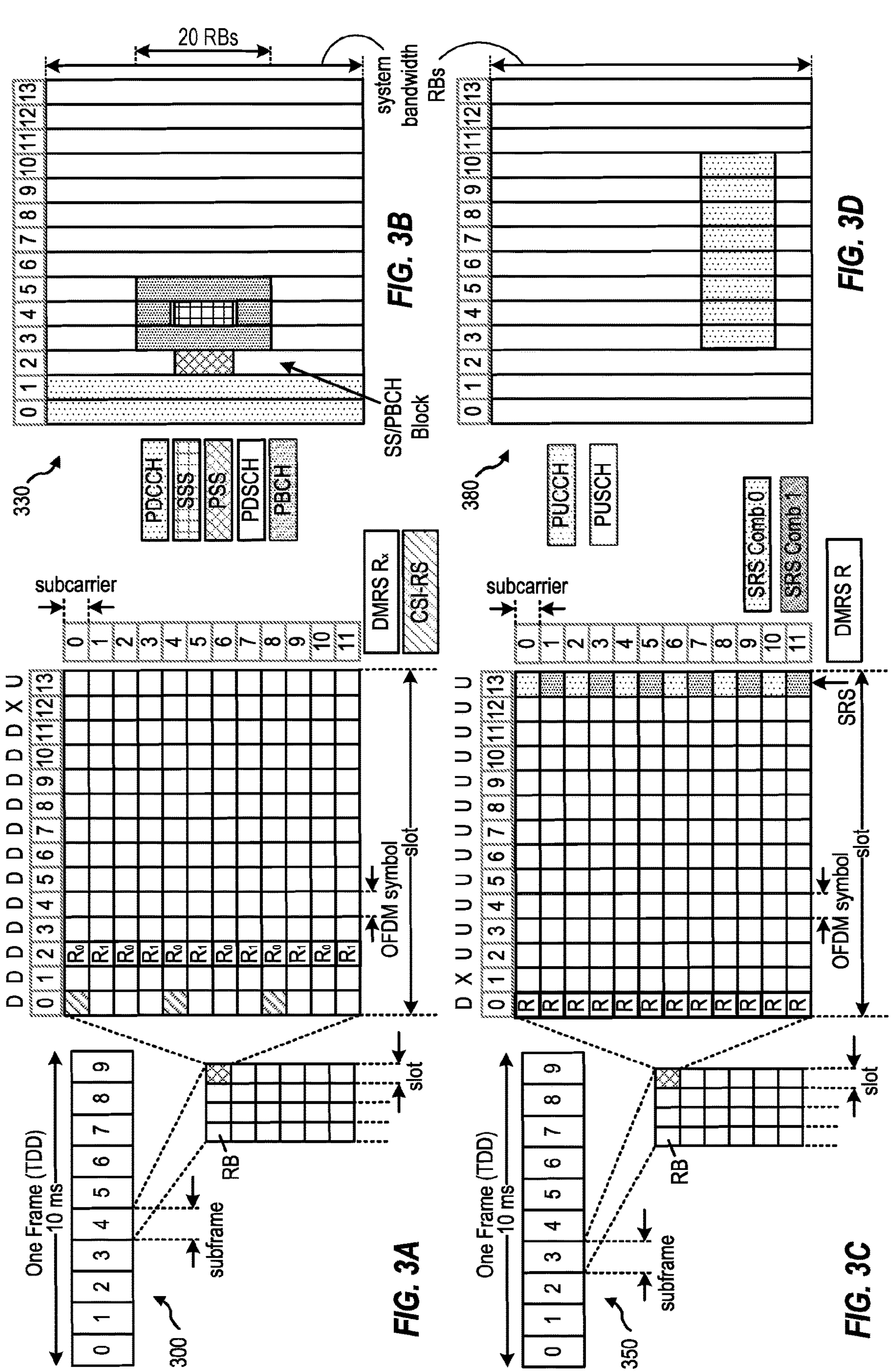
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, the BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Aspects Related to M-TRP Transmissions

Certain systems include transmission reception points (TRPs), which are present in one or more cells managed by one or more base stations (BSs). The TRPs may include large area TRPs and small area TRPs. The large area TRPs form a large transmission coverage using a high transmission power. The small area TRPs form a smaller transmission coverage than the large area TRPs, using a lower transmission power than the large area TRPs.

The system includes multiple TRPs to serve user equipments (UEs) to improve link reliability and capacity performance. For example, a UE may be served by a cluster of TRPs at any given time to support increased mobile data traffic and enhance the coverage. The clustering of TRPs dynamically change over time to adapt to varying radio conditions, spectrum utilization, and UE-mobility. The UE may be served by different clusters of TRPs at different time periods. The different serving TRP clusters have different number of TRPs associated with same or different cells.

Figure 4:
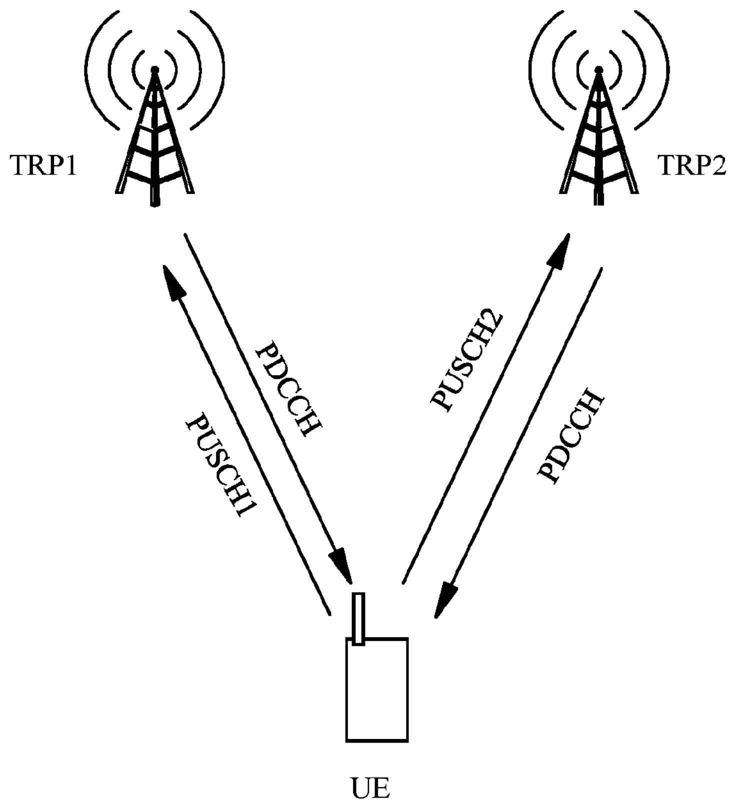
FIG. 4 depicts an example multiple transmission reception points (M-TRP) transmission scenario.

FIG. 4 illustrates an example multi-TRP transmission scenario, in which a UE is in communication with two TRPs, TRP1 and TRP2. As illustrated, the UE receives downlink (DL) transmissions from TRP1 and TRP2, and transmits uplink (UL) transmissions to the TRP1 and the TRP2. In one example, the UE may receive a physical downlink control channel (PDCCH), from one or both of the TRPs. Each PDCCH carries downlink control information (DCI) that schedules physical uplink control channel (PUSCH) transmissions to one or both of the TRPs. In the illustrated example, the DCI(s) schedule a first PUSCH (PUSCH1) for transmission to the TRP1 and a second PUSCH (PUSCH2) for transmission to the TRP2.

Aspects Related to Multi-PUSCH Scheduling for M-TRP

Currently, multi physical uplink shared channel (PUSCH) scheduling is applicable for a single beam transmission. For example, a single downlink control information (DCI) may schedule multiple PUSCHs, at least for a single transmission reception points (S-TRP). In such cases, a single transmission configuration indicator (TCI) state (e.g., corresponding to a single beam) may be applicable to all of the PUSCHs scheduled by that DCI.

Aspects of the present disclosure provide apparatuses, methods, processing systems, and computer-readable mediums for multi-PUSCH scheduling for multi-beam transmission. For example, according to certain aspects, a single DCI schedules multiple PUSCHs as S-TRP transmissions in an S-TRP operation and multiple TRP (M-TRP) transmissions in an M-TRP operation. A user equipment (UE) transmits each of the PUSCHs to one or more TRPs.

Figure 5:
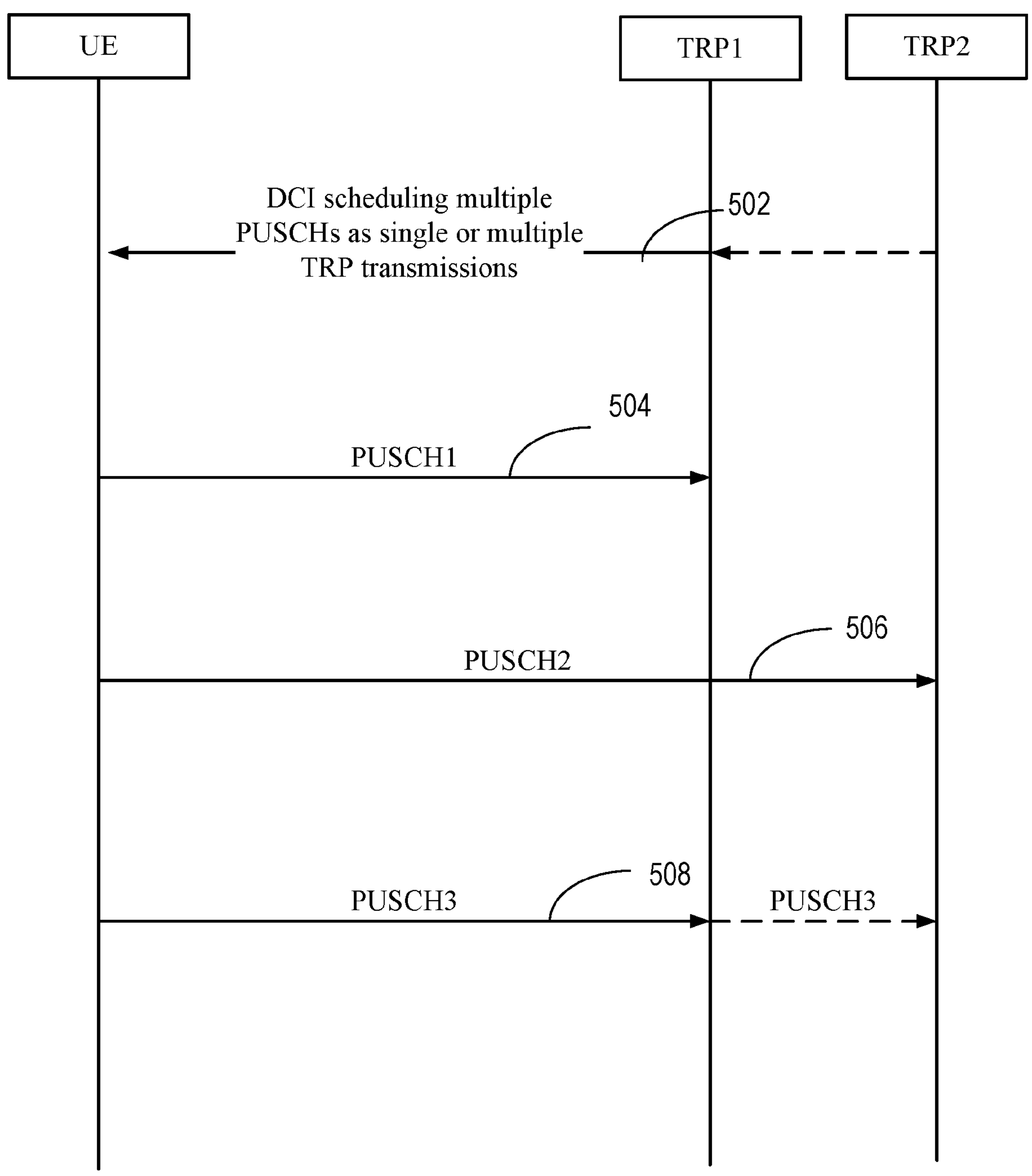
FIG. 5 depicts a call flow diagram illustrating example signaling for scheduling multiple physical uplink shared channels (PUSCHs) for multiple transmission reception points (M-TRP), in accordance with certain aspects of the present disclosure.

FIG. 5 depicts a call flow diagram illustrating example signaling for scheduling multiple PUSCHs for S-TRP and/or M-TRP, in accordance with certain aspects of the present disclosure. The example shows a UE in communication with two TRPs, TRP1 and TRP2, which may be under control of a base station (BS) (e.g., a gNB not shown).

At 502, one or more of the TRPs sends a DCI that schedules multiple PUSCHs to a UE. The DCI may indicate whether each of the PUSCHs is scheduled as an S-TRP or an M-TRP transmission. In some cases, the indication may be provided via one or more activated TCI states and/or one or more (S-TRP/m-TRP) switching bits. In the illustrated example, the DCI indicates first and second PUSCHs (PUSCH1 and PUSCH2) are to be sent as S-TRP transmissions to TRP1 and TRP2 using one TCI state, respectively, while a third PUSCH (PUSCH3) is to be sent as an M-TRP transmission, using different TCI states.

At 504, the UE sends PUSCH1 to TRP1. At 506, the UE sends PUSCH2 to TRP2. At 508, the UE sequentially sends PUSCH3 to both TRP1 and TRP2. In some cases, the PUSCH3 may be sent to TRP1 and TRP2 using time division multiplexing (TDM), frequency division multiplexing (FDM), and/or spatial division multiplexing (SDM), using different TCI states.

Examples of the signaling shown in FIG. 5 may be understood with reference to FIGS. 6A-8C.

In certain aspects, a DCI includes one or more switching bits. The switching bits may indicate whether PUSCHs are S-TRP transmissions (e.g., for TRP1 or TRP2) or M-TRP transmissions (e.g., for both TRP1 and TRP2, where the order may be TRP1 followed by TRP2, or TRP2 followed by TRP1).

In certain aspects, the one or more switching bits are indicated per PUSCH (e.g., to indicate whether the PUSCH is an S-TRP or an M-TRP transmission). This enables flexible scheduling per PUSCH (e.g., as some PUSCHs may only be for retransmission with a single TRP).

Figure 6A:
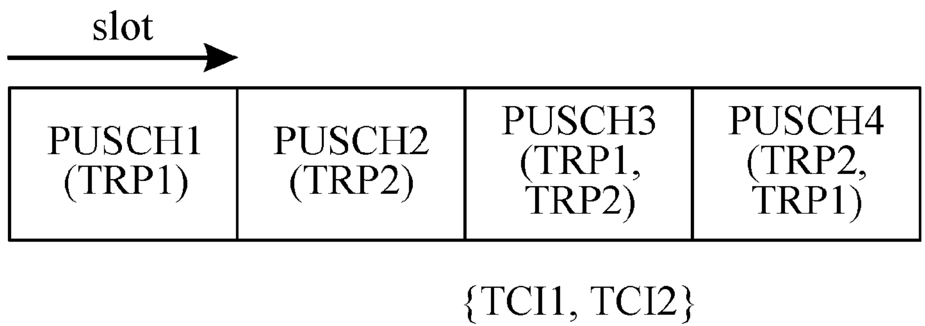
FIG. 6A depicts example PUSCHs scheduled as single TRP (S-TRP) and M-TRP transmissions, in accordance with certain aspects of the present disclosure.

For example, as illustrated in FIG. 6A, a UE may determine PUSCH1 is an S-TRP transmission (for TRP1), PUSCH2 is an S-TRP transmission (for TRP2), PUSCH3 is an M-TRP transmission (for TRP1 and TRP2), and PUSCH4 is an M-TRP transmission (for TRP2 and TRP1), based on the indicated one or more switching bits and the indicated number of TCI states.

In certain aspects, the one or more switching bits are indicated common to all PUSCHs (e.g., to indicate whether all PUSCHs are S-TRP or M-TRP transmissions).

Figure 6B:
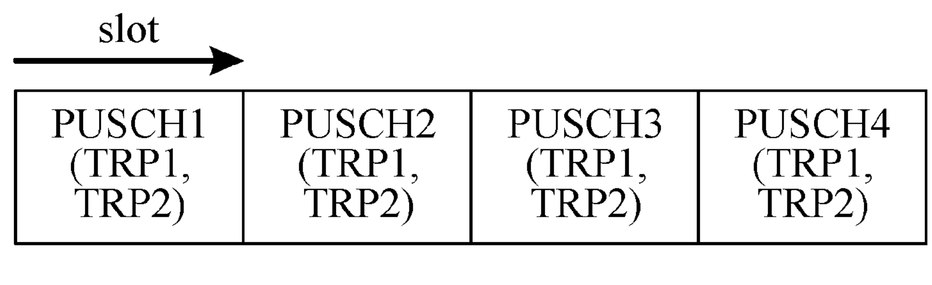
FIG. 6B depicts example PUSCHs scheduled as M-TRP transmissions, in accordance with certain aspects of the present disclosure.

For example, as illustrated in FIG. 6B, a UE may determine (based on the switching bits indicated for all PUSCHs) each PUSCH transmission (e.g., PUSCH1, PUSCH2, PUSCH3, and PUSCH4) is an M-TRP transmission (for TRP1 and TRP2).

In certain aspects, a DCI indicates TCI states for codebook based (CB) or non-codebook based (NCB) multiple input multiple output (MIMO) transmission in uplink. In certain aspects, the DCI indicates sounding reference signal (SRS) resource indicators (SRIs) for CB-MIMO, where the SRIs instead of TCIs may indicate the beam indication for CB-MIMO or NCB MIMO.

In certain aspects, a medium access control (MAC) control element (CE) activates two unified TCI states in a TCI codepoint or two SRIs that are common to all PUSCHs (e.g., the TCI states and/or SRIs are applied to all scheduled PUSCH transmissions). In one example, the two TCI states (indicated by a TCI codepoint or two SRIs) may be applicable when at least one PUSCH is indicated as an M-TRP transmission, or two PUSCHs are indicated as an S-TRP transmission but associated with different TRPs. In another example, the two TCI states may be applicable when all PUSCHs are indicated as M-TRP transmissions.

Figure 6C:
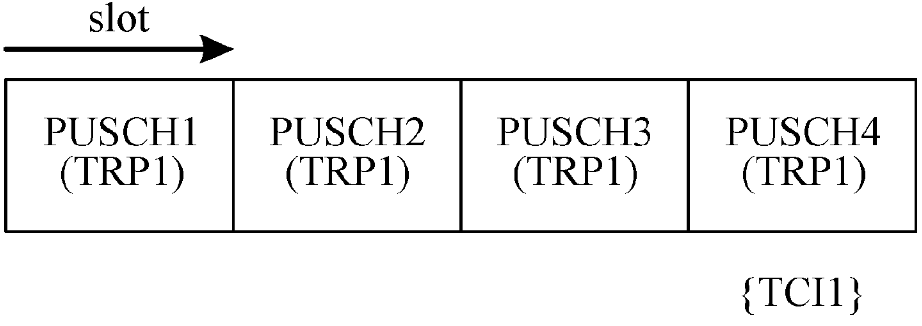
FIG. 6C depicts example PUSCHs scheduled as S-TRP transmissions, in accordance with certain aspects of the present disclosure.

In certain aspects, a DCI indicates a single TCI state and/or SRI applicable to all scheduled PUSCH transmissions. For example, as illustrated in FIG. 6C, when all PUSCHs (e.g., PUSCH1, PUSCH2, PUSCH3, and PUSCH4) are associated with a same TRP (e.g., TRP 1), a single TCI state (e.g., TCI1) may be applicable to all the PUSCHs.

In certain aspects, a DCI includes a time domain resource allocation (TDRA) field. The TDRA field indicates time domain resources for multiple PUSCHs. In some cases, a number of scheduled PUSCHs may be implicitly indicated to a UE by a number of valid separate start and length indicator vectors (SLIVs).

In one example, each PUSCH has a separate SLIV, per the time domain resources. In another example, each PUSCH has a separate mapping type (e.g., mapping type A or mapping type B), per the time domain resources. In another example, each PUSCH has a separate time offset (K2) between a slot in which the DCI is received and the PUSCH is scheduled, per the time domain resources. In another example, each PUSCH has a separate repetition number, per the time domain resources. In some cases, the DCI may indicate a repetition number per PUSCH (e.g., for each of PUSCH1, PUSCH2, and PUSCH3). In some cases, the DCI may indicate the repetition number common to all PUSCHs (e.g., for all of PUSCH1, PUSCH2, and PUSCH3).

In certain aspects, the TDRA indicates the time domain resources for two PUSCH occasions for a PUSCH, which is scheduled as an M-TRP transmission to two TRPs.

In one example, as illustrated in FIG. 7A, when an intra-slot time division multiplexing (TDM) scheme is configured, a TDRA field indicated for a PUSCH is split into two halves for two PUSCH occasions to the PUSCH with an M-TRP transmission. The first and second half of the TRDA field is applied as first/second PUSCH occasion.

In another example, as illustrated in FIG. 7B, when an inter-slot TDM scheme is configured (AABB, or ABAB), a TDRA field may form two sets for two PUSCH occasions with an M-TRP transmission. The first/second set (A/B) of the TDRA field indicated for a PUSCH is applied as first/second set of PUSCH occasions to the PUSCH with the M-TRP transmission. In this example, "A" represents TRP1 and "B" represents TRP2.

In certain aspects, a DCI includes a frequency domain resource allocation (FDRA) field. The FDRA field is applied to all PUSCHs. The FDRA field indicates frequency domain resources for two PUSCH occasions for a PUSCH scheduled as an M-TRP transmission to two TRPs.

For example, as illustrated in FIG. 7C, when a frequency division multiplexing (FDM) scheme is configured, a FDRA field is split into two PUSCH occasions indicated for all PUSCHs with an M-TRP transmission. The lower/upper half of the FDRA field is applied as first/second PUSCH occasion in each PUSCH with the M-TRP transmission.

In certain aspects, a DCI indicates one or more demodulation reference signal (DMRS) ports. The one or more DMRS ports correspond to one or more DMRS code division multiplexed (CDM) groups applied to all scheduled PUSCHs.

For example, as illustrated in FIG. 7D, when a spatial division multiplexing (SDM) scheme is configured, layers in a first and a second group of two DMRS CDM groups are applied to first/second PUSCH occasions in each PUSCH with an M-TRP transmission.

In certain aspects, a UE may be configured to enable the SDM scheme, the FDM (e.g., single CW of one rate matching among two PUSCH occasions to a PUSCH with an M-TRP transmission or two CWs of different rate matchings in two PUSCH occasions to a PUSCH with the M-TRP transmission) scheme, the intra-slot TDM scheme, and/or the inter-slot TDM scheme.

In certain aspects, a DCI indicates a modulation and coding scheme (MCS). The MCS is applicable to all the PUSCHs. In some cases, when a PUSCH has two PUSCH occasions, a transport block size (TBS) is determined by a first PUSCH occasion. The first PUSCH occasion may have a lower part of FDRA in FDM based M-TRP transmission, be an earlier PUSCH occasion in TDM based M-TRP transmission, or a lower DMRS CDM group index in SDM based M-TRP transmission.

In certain aspects, a DCI indicates a new data assignment indicator (NDI) per PUSCH. The NDI indicates a PUSCH is for a new transmission or a retransmission.

In certain aspects, a DCI indicates a redundancy version (RV) per PUSCH. In one example, when two PUSCH occasions are configured to apply a single RV, the indicated RV is applied to the two PUSCH occasions with a single rate matching. In another example, when two PUSCH occasions are configured to apply two RVs, the indicated RV is applied to a first PUSCH occasion and RV offset is applied to a second PUSCH occasion, using different rate matchings. In some cases, the RV offset is configured per PUSCH. In some cases, the RV offset is common to all PUSCHs.

In certain aspects, a DCI indicates a transmission power control (TPC) command. In some cases, the TPC command may be per PUSCH. In some cases, the TPC command may be common to all PUSCHs. When the PUSCH is scheduled as an M-TRP transmission, the DCI indicates one or more TPC commands/fields. In one example, when one TPC command is indicated, the indicated TPC command is applied to two PUSCH occasions in a PUSCH. In another example, when two TPC commands are indicated, a first TPC command is applied to a first PUSCH occasion in a PUSCH and a second TPC command is applied to a second PUSCH occasion in the PUSCH.

In certain aspects, a DCI indicates a precoder indication. In one example, the precoder indication may indicate one or two sounding reference signal (SRS) resource indicators (SRIs) for non-CB-MIMO (NCB-MIMO). In another example, the precoder indication may indicate transmit one or two precoding matrix indexes (TPMIs) and or SRIs for CB-MIMO.

In certain aspects, the precoder indication indicates two TPMIs/SRIs common to all PUSCHs. In some cases, this precoder indication is applicable when at least one PUSCH is indicated as an M-TRP transmission or two PUSCHs are indicated as an S-TRP transmission but associated with different TRPs.

For example, as illustrated in FIG. 8A, PUSCH1 is an S-TRP transmission (for TRP1) and a single TPM1 (e.g., TPMI1) is applicable to PUSCH1. PUSCH2 is an S-TRP transmission (for TRP2) and a single TPM1 (e.g., TPMI2) is applicable to PUSCH2. PUSCH3 is an M-TRP transmission (for TRP1 and TRP2 in order) and two TPMIs (e.g., TPMI1 and TPM2) are applicable to PUSCH1 and PUSCH2. PUSCH4 is an M-TRP transmission (for TRP2 and TRP 1 in order) and two TPMIs (e.g., TPMI2 and TPM1) are applicable to PUSCH2 and PUSCH1.

In some cases, the precoder indication is applicable when all PUSCHs are indicated as M-TRP transmissions. For example, as illustrated in FIG. 8B, each PUSCH transmission (e.g., PUSCH1, PUSCH2, PUSCH3, and PUSCH4) is an M-TRP transmission (for TRP1 and TRP2) and two TPMIs (e.g., TPMI1 and TPM2) are applicable to each PUSCH.

In some cases (e.g., TDM/FDM schemes for a PUSCH in an M-TRP transmission), two TPMIs/SRIs are of a same rank for precoder indications. In some cases (e.g., for SDM scheme), two TPMIs/SRIs may be separately indicated as two fields or jointly indicated in a single field to a UE.

In certain aspects, the precoder indication indicates a single TPM1/SRI common to all the PUSCHs. This precoder indication is applicable when all PUSCHs are associated with a same TRP. For example, as illustrated in FIG. 8C, PUSCHs (e.g., PUSCH1, PUSCH2, PUSCH3, and PUSCH4) are associated with a same TRP (e.g., TRP 1) and a single TPM1 (e.g., TPMI1) is applicable to all the PUSCHs.

In certain aspects, a DCI may indicate a channel state information (CSI) request for beam report configured for an M-TRP operation. The CSI request may indicate a CSI trigger state, which is associated with at least one CSI report configured for beam reporting configured for the M-TRP operation. The CSI report configured for the M-TRP operation is associated with two channel measurement resource sets. A channel measurement resource set may be a CSI resource set, or a set of synchronization signal block (SSB) resources. For example, the CSI trigger state may be configured to be associated with a CSI report configuration by a radio resource control (RRC) parameter (CSI-AssociatedReportConfigInfo). In some cases, a first RRC parameter (resourcesForChannel) and a second RRC parameter (resourcesForChannel) are configured in the CSI-AssociatedReportConfigInfo, which are for the beam reporting in the M-TRP operation. In response to the CSI request, a UE may transmit at least one group of two DL reference signal (RS) indices (i.e., CSI RS index or SSB index) where the UE can simultaneously receive the two RS indices in a same group. The two RSs in the same group are selected from the channel measurement resource sets associated with the first RRC parameter and the second RRC parameter, respectively.

In certain aspects, a DCI indicates one or more DMRS phase tracking reference signal (PTRS) association indications. In some cases, when one SRI and/or TPM1 is indicated for an S-TRP transmission, one DMRS-PTRS association indication is applicable to all PUSCHs. In some cases, when two SRI and/or TPMIs are indicated for an M-TRP transmission (at least one PUSCH with the M-TRP transmission, or two PUSCHs of different TRP transmissions), two DMRS-PTRS association indications are applicable for all PUSCHs. For example, a first DMRS-PTRS association indication is applied to a first PUSCH occasion in each PUSCH with M-TRP transmission, and a second DMRS-PTRS association is applied to a second PUSCH occasion in each PUSCH with M-TRP. In some cases (e.g., for TDM scheme), the DMRS-PTRS association per PUSCH occasion may be as in Rel'17. In some cases (e.g., for SDM scheme), the DMRS-PTRS association may be as in Rel'15.

Example Methods

FIG. 9 shows an example of a method 900 for scheduling of S-TRP or M-TRP transmissions using a DCI, according to aspects of the present disclosure. In some aspects, a UE, such as the UE 104 of FIGS. 1 and 2, or a processing system 1105 of FIG. 11, may perform the method 900. The method 900 may be implemented as software components that are executed and run on one or more processors (e.g., the controller/processor 280 of FIG. 2). Further, one or more antennas (e.g., the antennas 252 of FIG. 2) may enable transmission and reception of signals by the UE. In certain aspects, the transmission and/or reception of signals by the UE may be implemented via a bus interface of one or more processors (e.g., the controller/processor 280) obtaining and/or outputting signals.

At 905, the UE receives a DCI that schedules multiple PUSCHs and indicates whether each of the PUSCHs is scheduled as an S-TRP or M-TRP transmission. In some cases, the operations of this step refer to, or may be performed using, antenna(s) and receiver/transceiver components of the UE 104 shown in FIG. 1 or FIG. 2, and/or DCI reception circuitry as described with reference to FIG. 11.

At 910, the UE transmits each of the PUSCHs to one or more of the TRPs in accordance with information indicated in the DCI. In some cases, the operations of this step refer to, or may be performed using, antenna(s) and transmitter/transceiver components of the UE 104 shown in FIG. 1 or FIG. 2, and/or PUSCH transmission circuitry as described with reference to FIG. 11.

In some aspects, the DCI includes one or more bits that indicate whether the PUSCHs are S-TRP or M-TRP transmissions. In some aspects, the one or more bits include one or more bits, per scheduled PUSCH, that indicate whether that PUSCH is an S-TRP or M-TRP transmission. In some aspects, the one or more bits indicate whether all PUSCHs are S-TRP or all PUSCHs are M-TRP transmissions.

In some aspects, the DCI indicates at least one of: one or more TCI states or one or more SRIs. In some aspects, the one or more TCI states or one or more SRIs are applied to all scheduled PUSCH transmissions. In some aspects, all PUSCH transmissions are associated with a same TRP and the DCI indicates a single TCI state or SRI applied to all scheduled PUSCH transmissions.

In some aspects, the DCI includes a TDRA field that indicates time domain resources for the multiple PUSCHs. In some aspects, each PUSCH has a separate SLIV, a mapping type, and an offset between a slot in which the DCI is received and the PUSCH is scheduled. In some aspects, the DCI also indicates a repetition number per PUSCH or a repetition number common to all the PUSCHs. In some aspects, the TDRA indicates time domain resources for two PUSCH occasions for a PUSCH scheduled as an M-TRP transmission to two TRPs. In some aspects, the DCI includes a FDRA field applied to all of the scheduled PUSCHs. In some aspects, the FDRA indicates frequency domain resources for two PUSCH occasions for a PUSCH scheduled as an M-TRP transmission to two TRPs.

In some aspects, the DCI indicates one or more DMRS CDM groups applied to all of the scheduled PUSCHs. In some aspects, the DCI indicates at least one of: a MCS to be applied to all the PUSCHs, a NDI per PUSCH, a RV per PUSCH, or a TPC command indicated per PUSCH or common to all the PUSCHs.

In some aspects, the DCI indicates at least one precoder indication and at least one DMRS PTRS association indication. In some aspects, the at least one precoder indication indicates: at least two TPMIs or SRIs common to all the PUSCHs, or a single TPMI or SRI common to all the PUSCHs. In some aspects, the at least one DMRS PTRS association indication comprises one DMRS-PTRS association applied to all the PUSCHs, if one TPMI or SRI is indicated. In some aspects, the at least one DMRS PTRS association indication comprises at least two DMRS-PTRS associations for all the PUSCHs, if at least two TPMIs or SRIs are indicated.

FIG. 10 shows an example of a method 1000 for scheduling of S-TRP or M-TRP transmissions using DCI, according to aspects of the present disclosure. In some aspects, a network entity, such as the BS 102 of FIGS. 1 and 2, or a processing system 1205 of FIG. 12, may perform the method 1000. The method 1000 may be implemented as software components that are executed and run on one or more processors (e.g., the controller/processor 240 of FIG. 2). Further, one or more antennas (e.g., the antennas 234 of FIG. 2) may enable transmission and reception of signals by the network entity. In certain aspects, the transmission and/or reception of signals by the network entity may be implemented via a bus interface of one or more processors (e.g., the controller/processor 240) obtaining and/or outputting signals.

At 1005, the network entity transmits, to a UE, a DCI that schedules multiple PUSCHs and indicates whether each of the PUSCHs is scheduled as an S-TRP or M-TRP transmission. In some cases, the operations of this step refer to, or may be performed using, antenna(s) and transmitter/transceiver components of the BS 102 shown in FIG. 1 or FIG. 2, and/or DCI transmission circuitry as described with reference to FIG. 12.

At 1010, the network entity receives each of the PUSCHs, via one or more of the TRPs, in accordance with information indicated in the DCI. In some cases, the operations of this step refer to, or may be performed using, antenna(s) and receiver/transceiver components of the BS 102 shown in FIG. 1 or FIG. 2, and/or PUSCH reception circuitry as described with reference to FIG. 12.

In some aspects, the DCI includes one or more bits that indicate whether the PUSCHs are S-TRP or M-TRP transmissions. In some aspects, the one or more bits include one or more bits, per scheduled PUSCH, that indicate whether that PUSCH is an S-TRP or M-TRP transmission. In some aspects, the one or more bits indicate whether all PUSCHs are S-TRP or all PUSCHs are M-TRP transmissions.

In some aspects, the DCI indicates at least one of: one or more TCI states, or one or more SRIs. In some aspects, the one or more TCI states or one or more SRIs are applied to all scheduled PUSCH transmissions. In some aspects, all PUSCH transmissions are associated with a same TRP and the DCI indicates a single TCI state or SRI applied to all scheduled PUSCH transmissions. In some aspects, the DCI comprises a TDRA field that indicates time domain resources for the multiple PUSCHs.

Example Wireless Communication Devices

Figure 11:
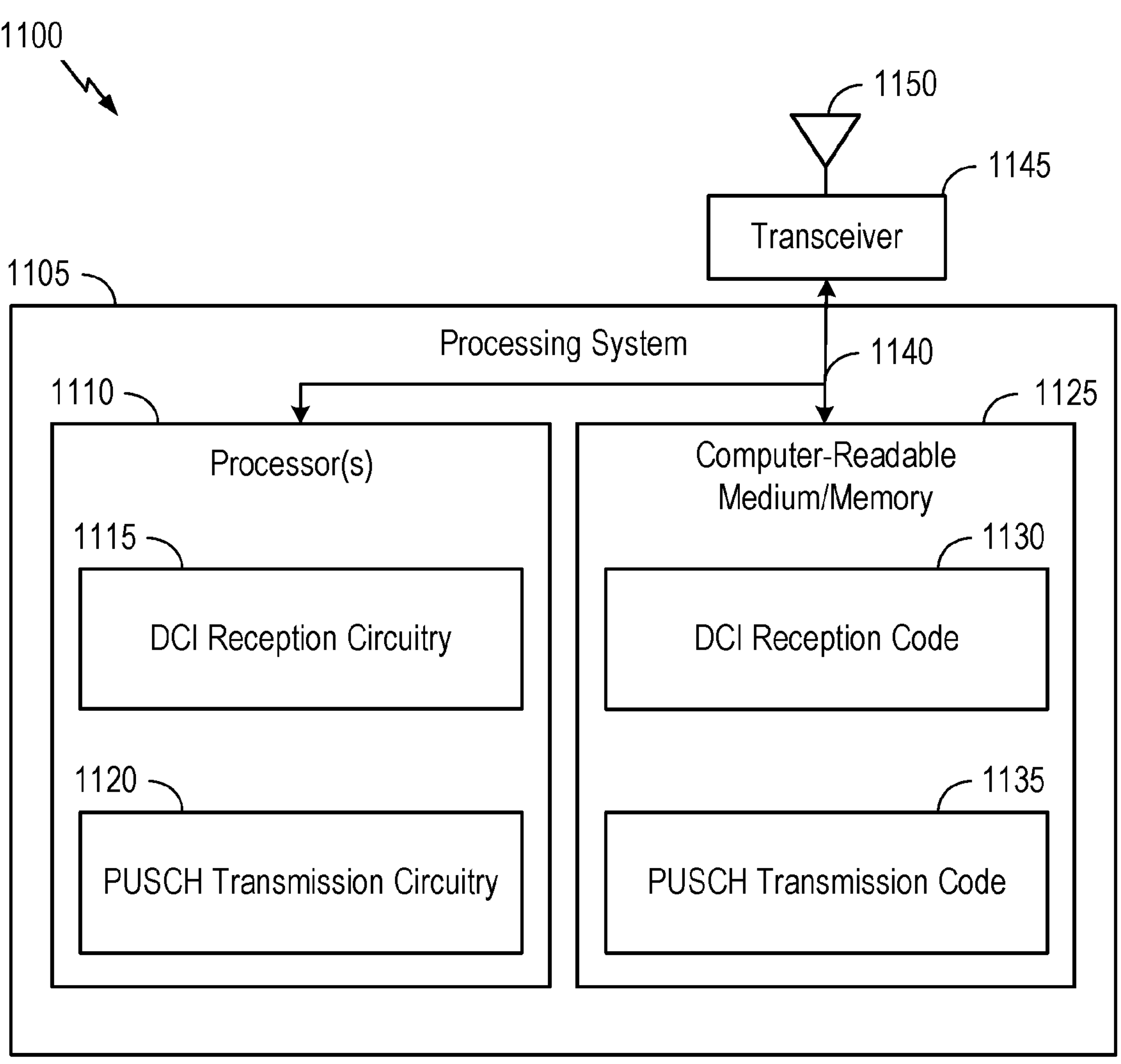
FIGS. 11 and 12 show examples of a communications device, in accordance with certain aspects of the present disclosure.

FIG. 11 depicts an example communications device 1100 that includes various components operable, configured, or adapted to perform operations for the techniques disclosed herein, such as the operations depicted and described with respect to FIG. 9. In some examples, communication device may be a UE 104 as described, for example with respect to FIGS. 1 and 2.

Communications device 1100 includes a processing system 1105 coupled to a transceiver 1145 (e.g., a transmitter and/or a receiver). Transceiver 1145 is configured to transmit (or send) and receive signals for the communications device 1100 via an antenna 1150, such as the various signals as described herein. A transceiver 1145 may communicate bi-directionally, via antennas 1150, wired, or wireless links as described above. For example, the transceiver 1145 may represent a wireless transceiver 1145 and may communicate bi-directionally with another wireless transceiver 1145. The transceiver 1145 may also include or be connected to a modem to modulate the packets and provide the modulated packets to for transmission, and to demodulate received packets. In some examples, transceiver 1145 may be tuned to operate at specified frequencies. For example, a modem can configure the transceiver 1145 to operate at a specified frequency and power level based on the communication protocol used by the modem.

Processing system 1105 may be configured to perform processing functions for communications device 1100, including processing signals received and/or to be transmitted by communications device 1100. Processing system 1105 includes one or more processors 1110 coupled to a computer-readable medium/memory 1125 via a bus 1140.

In some examples, one or more processors 1110 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1110 are configured to operate a memory array using a memory controller. In other cases, a memory controller is integrated into the one or more processors 1110. In some cases, the one or more processors 1110 are configured to execute computer-readable instructions stored in a memory to perform various functions. In some aspects, one or more processors 1110 include special purpose components for modem processing, baseband processing, digital signal processing, or transmission processing.

In certain aspects, computer-readable medium/memory 1125 is configured to store instructions (e.g., computer-executable code) that when executed by the one or more processors 1110, cause the one or more processors 1110 to perform the operations illustrated in FIG. 9, or other operations for performing the various techniques discussed herein.

In one aspect, computer-readable medium/memory 1125 includes DCI reception code 1130 and PUSCH transmission code 1135.

Examples of a computer-readable medium/memory 1125 include random access memory (RAM), read-only memory (ROM), solid state memory, a hard drive, a hard disk drive, etc. In some examples, computer-readable medium/memory 1125 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1100 may provide means for performing the methods described herein, including with respect to FIG. 9.

In some examples, means for transmitting or sending (or means for outputting for transmission) may include the transceivers 254 and/or antenna(s) 252 of the UE 104 illustrated in FIG. 2 and/or transceiver 1145 and antenna 1150 of the communication device in FIG. 11.

In some examples, means for receiving (or means for obtaining) may include the transceivers 254 and/or antenna(s) 252 of the UE 104 illustrated in FIG. 2 and/or transceiver 1145 and antenna 1150 of the communication device in FIG. 11.

In some examples, means for receiving and means for transmitting may include various processing system 1105 components, such as: the one or more processors 1110 in FIG. 11, or aspects of the UE 104 depicted in FIG. 2, including receive processor 258, transmit processor 264, TX MIMO processor 266, and/or controller/processor 280.

In one aspect, one or more processors 1110 includes DCI reception circuitry 1115 and PUSCH transmission circuitry 1120. According to some aspects, DCI reception circuitry 1115 receives a DCI that schedules multiple PUSCHs and indicates whether each of the PUSCHs is scheduled as an S-TRP or M-TRP transmission. According to some aspects, PUSCH transmission circuitry 1120 transmits each of the PUSCHs to one or more of the TRPs in accordance with information indicated in the DCI.

In some aspects, the DCI includes one or more bits that indicate whether the PUSCHs are S-TRP or M-TRP transmissions. In some aspects, the one or more bits include one or more bits, per scheduled PUSCH, that indicate whether that PUSCH is an S-TRP or M-TRP transmission. In some aspects, the one or more bits indicate whether all PUSCHs are S-TRP or all PUSCHs are M-TRP transmissions. In some aspects, the DCI indicates at least one of: one or more TCI states or one or more SRIs. In some aspects, the one or more TCI states or one or more SRIs are applied to all scheduled PUSCH transmissions. In some aspects, all PUSCH transmissions are associated with a same TRP and the DCI indicates a single TCI state or SRI applied to all scheduled PUSCH transmissions.

In some aspects, the DCI includes a TDRA field that indicates time domain resources for the multiple PUSCHs. In some aspects, each PUSCH has a separate SLIV, mapping type, and offset between a slot in which the DCI is received and the PUSCH is scheduled. In some aspects, the DCI also indicates a repetition number per PUSCH or a repetition number common to all the PUSCHs. In some aspects, the TDRA indicates time domain resources for two PUSCH occasions for a PUSCH scheduled as an M-TRP transmission to two TRPs.

In some aspects, the DCI includes a FDRA field applied to all of the scheduled PUSCHs. In some aspects, the FDRA indicates frequency domain resources for two PUSCH occasions for a PUSCH scheduled as an M-TRP transmission to two TRPs. In some aspects, the DCI indicates one or more DMRS CDM groups applied to all of the scheduled PUSCHs. In some aspects, the DCI indicates at least one of: a MCS to be applied to all the PUSCHs, a NDI per PUSCH, a RV per PUSCH, or a TPC command indicated per PUSCH or common to all the PUSCHs.

In some aspects, the DCI indicates at least one precoder indication and at least one DMRS PTRS association indication. In some aspects, the at least one precoder indication indicates: at least two TPMIs or SRIs common to all the PUSCHs, or a single TPMI or SRI common to all the PUSCHs. In some aspects, the at least one DMRS PTRS association indication includes one DMRS-PTRS association applied to all the PUSCHs, if one TPMI or SRI is indicated. In some aspects, the at least one DMRS PTRS association indication includes at least two DMRS-PTRS associations for all the PUSCHs, if at least two TPMIs or SRIs are indicated.

Notably, FIG. 11 is just use example, and many other examples and configurations of communication device are possible.

Figure 12:
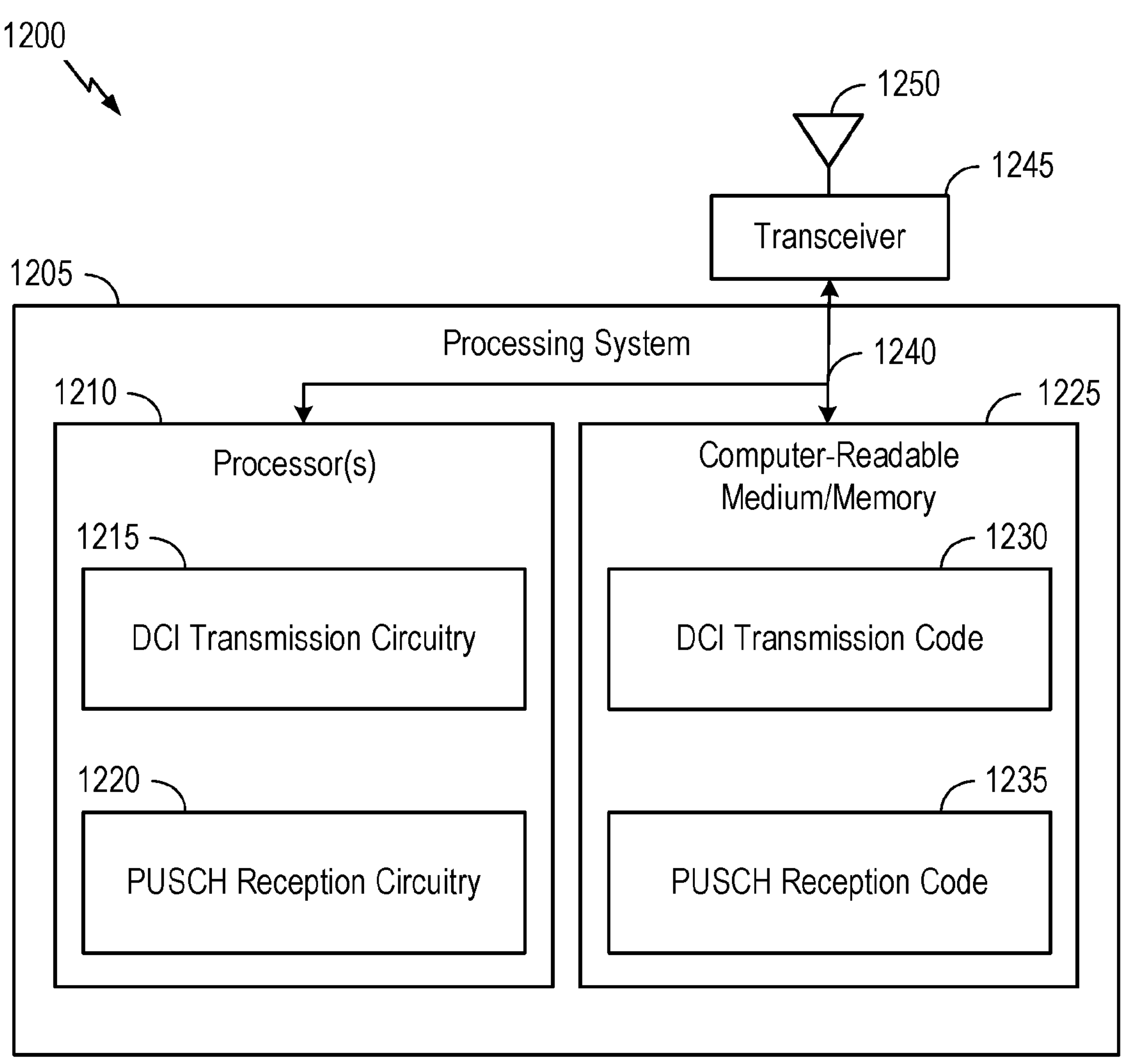

FIG. 12 depicts an example communications device 1200 that includes various components operable, configured, or adapted to perform operations for the techniques disclosed herein, such as the operations depicted and described with respect to FIG. 10. In some examples, communication device may be a BS 102 as described, for example with respect to FIGS. 1 and 2.

Communications device 1200 includes a processing system 1205 coupled to a transceiver 1245 (e.g., a transmitter and/or a receiver). Transceiver 1245 is configured to transmit (or send) and receive signals for the communications device 1200 via an antenna 1250, such as the various signals as described herein. In some aspects, transceiver 1245 is an example of, or includes aspects of, the corresponding element described with reference to FIG. 11.

Processing system 1205 may be configured to perform processing functions for communications device 1200, including processing signals received and/or to be transmitted by communications device 1200. Processing system 1205 includes one or more processors 1210 coupled to a computer-readable medium/memory 1225 via a bus 1240. In certain aspects, computer-readable medium/memory 1225 is configured to store instructions (e.g., computer-executable code) that when executed by the one or more processors 1210, cause the one or more processors 1210 to perform the operations illustrated in FIG. 10, or other operations for performing the various techniques discussed herein.

In one aspect, computer-readable medium/memory 1225 includes DCI transmission code 1230 and PUSCH reception code 1235. In some aspects, computer-readable medium/memory 1225 is an example of, or includes aspects of, the corresponding element described with reference to FIG. 11.

Various components of communications device 1200 may provide means for performing the methods described herein, including with respect to FIG. 10.

In some examples, means for transmitting or sending (or means for outputting for transmission) may include the transceivers 232 and/or antenna(s) 234 of the BS 102 illustrated in FIG. 2 and/or transceiver 1245 and antenna 1250 of the communication device in FIG. 12.

In some examples, means for receiving (or means for obtaining) may include the transceivers 232 and/or antenna(s) 234 of the BS 102 illustrated in FIG. 2 and/or transceiver 1245 and antenna 1250 of the communication device in FIG. 12.

In some examples, means for transmitting and means for receiving may include various processing system 1205 components, such as: the one or more processors 1210 in FIG. 12, or aspects of the BS 102 depicted in FIG. 2, including receive processor 238, transmit processor 220, TX MIMO processor 230, and/or controller/processor 240.

In one aspect, one or more processors 1210 includes DCI transmission circuitry 1215 and PUSCH reception circuitry 1220. In some aspects, one or more processors 1210 are examples of, or include aspects of, the corresponding element described with reference to FIG. 11.

According to some aspects, DCI transmission circuitry 1215 transmits, to a UE, a DCI that schedules multiple PUSCHs and indicates whether each of the PUSCHs is scheduled as an S-TRP or M-TRP transmission. According to some aspects, PUSCH reception circuitry 1220 receives each of the PUSCHs, via one or more of the TRPs, in accordance with information indicated in the DCI.

In some aspects, the DCI includes one or more bits that indicate whether the PUSCHs are S-TRP or M-TRP transmissions. In some aspects, the one or more bits include one or more bits, per scheduled PUSCH, that indicate whether that PUSCH is an S-TRP or M-TRP transmission. In some aspects, the one or more bits indicate whether all PUSCHs are S-TRP or all PUSCHs are M-TRP transmissions. In some aspects, the DCI indicates at least one of: one or more TCI states, or one or more SRIs. In some aspects, the one or more TCI states or one or more SRIs are applied to all scheduled PUSCH transmissions. In some aspects, all PUSCH transmissions are associated with a same TRP and the DCI indicates a single TCI state or SRI applied to all scheduled PUSCH transmissions. In some aspects, the DCI includes a TDRA field that indicates time domain resources for the multiple PUSCHs.

Notably, FIG. 12 is just use example, and many other examples and configurations of communication device are possible.

EXAMPLE CLAUSES

Implementation examples are described in the following numbered clauses:

Clause 1: A method for wireless communications by a UE, comprising: receiving a DCI that schedules multiple PUSCHs and indicates whether each of the PUSCHs is scheduled as an S-TRP or M-TRP transmission and transmitting each of the PUSCHs to one or more of the TRPs in accordance with information indicated in the DCI.

Clause 2: The method of Clause 1, wherein: the DCI comprises one or more bits that indicate whether the PUSCHs are S-TRP or M-TRP transmissions.

Clause 3: The method of any one of Clauses 1-2, wherein: the one or more bits comprise one or more bits, per scheduled PUSCH, that indicate whether that PUSCH is an S-TRP or M-TRP transmission.

Clause 4: The method of any one of Clauses 1-3, wherein: the one or more bits indicate whether all PUSCHs are S-TRP or all PUSCHs are M-TRP transmissions.

Clause 5: The method of any one of Clauses 1-4, wherein: the DCI indicates at least one of: one or more TCI states or one or more SRIs.

Clause 6: The method of any one of Clauses 1-5, wherein: the one or more TCI states or one or more SRIs are applied to all scheduled PUSCH transmissions.

Clause 7: The method of any one of Clauses 1-6, wherein: all PUSCH transmissions are associated with a same TRP and the DCI indicates a single TCI state or SRI applied to all scheduled PUSCH transmissions.

Clause 8: The method of any one of Clauses 1-7, wherein: the DCI comprises a TDRA field that indicates time domain resources for the multiple PUSCHs.

Clause 9: The method of any one of Clauses 1-8, wherein: each PUSCH has a separate SLIV, mapping type, and offset between a slot in which the DCI is received and the PUSCH is scheduled.

Clause 10: The method of any one of Clauses 1-9, wherein: the DCI also indicates a repetition number per PUSCH or a repetition number common to all the PUSCHs.

Clause 11: The method of any one of Clauses 1-10, wherein: the TDRA indicates time domain resources for two PUSCH occasions for a PUSCH scheduled as an M-TRP transmission to two TRPs.

Clause 12: The method of any one of Clauses 1-11, wherein: the DCI comprises a FDRA field applied to all of the scheduled PUSCHs.

Clause 13: The method of any one of Clauses 1-12, wherein: the FDRA indicates frequency domain resources for two PUSCH occasions for a PUSCH scheduled as an M-TRP transmission to two TRPs.

Clause 14: The method of any one of Clauses 1-13, wherein: the DCI indicates one or more DMRS CDM groups applied to all of the scheduled PUSCHs.

Clause 15: The method of any one of Clauses 1-14, wherein: the DCI indicates at least one of: a MCS to be applied to all the PUSCHs, a NDI per PUSCH, a RV per PUSCH, or a TPC command indicated per PUSCH or common to all the PUSCHs.

Clause 16: The method of any one of Clauses 1-15, wherein: the DCI indicates at least one precoder indication and at least one DMRS PTRS association indication.

Clause 17: The method of any one of Clauses 1-16, wherein: the at least one precoder indication indicates: at least two TPMIs or SRIs common to all the PUSCHs, or a single TPMI or SRI common to all the PUSCHs.

Clause 18: The method of any one of Clauses 1-17, wherein: the at least one DMRS PTRS association indication comprises one DMRS-PTRS association applied to all the PUSCHs, if one TPMI or SRI is indicated; or at least two DMRS-PTRS associations for all the PUSCHs, if at least two TPMIs or SRIs are indicated.

Clause 19: A method for wireless communication by a network entity, comprising: transmitting, to a UE, a DCI that schedules multiple PUSCHs and indicates whether each of the PUSCHs is scheduled as an S-TRP or M-TRP transmission and receiving each of the PUSCHs, via one or more of the TRPs, in accordance with information indicated in the DCI.

Clause 20: The method of Clause 19, wherein: the DCI comprises one or more bits that indicate whether the PUSCHs are S-TRP or M-TRP transmissions.

Clause 21: The method of any one of Clauses 19-20, wherein: the one or more bits comprise one or more bits, per scheduled PUSCH, that indicate whether that PUSCH is an S-TRP or M-TRP transmission.

Clause 22: The method of any one of Clauses 19-21, wherein: the one or more bits indicate whether all PUSCHs are S-TRP or all PUSCHs are M-TRP transmissions.

Clause 23: The method of any one of Clauses 19-22, wherein: the DCI indicates at least one of: one or more TCI states, or one or more SRIs.

Clause 24: The method of any one of Clauses 19-23, wherein: the one or more TCI states or one or more SRIs are applied to all scheduled PUSCH transmissions.

Clause 25: The method of any one of Clauses 19-24, wherein: all PUSCH transmissions are associated with a same TRP and the DCI indicates a single TCI state or SRI applied to all scheduled PUSCH transmissions.

Clause 26: The method of any one of Clauses 19-25, wherein: the DCI comprises a TDRA field that indicates time domain resources for the multiple PUSCHs.

Clause 27: An apparatus/processing system, comprising: a memory comprising computer-executable instructions; one or more processors configured to execute the computer-executable instructions and cause the processing system to perform a method in accordance with any one of Clauses 1-26.

Clause 28: An apparatus/processing system, comprising means for performing a method in accordance with any one of Clauses 1-26.

Clause 29: A non-transitory computer-readable medium comprising computer-executable instructions that, when executed by one or more processors of a processing system, cause the processing system to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and base station (BS) 102, next generation NodeB (gNB or gNodeB), access point (AP), distributed unit (DU), carrier, or transmission reception point may be used interchangeably. A BS 102 may provide communication coverage for a macro cell, a pico cell, a femto cell, and/or other types of cells.

A macro cell may generally cover a relatively large geographic area (e.g., several kilometers in radius) and may allow unrestricted access by user equipments (UEs) 104 with service subscription. A pico cell may cover a relatively small geographic area (e.g., a sports stadium) and may allow unrestricted access by UEs 104 with service subscription. A femto cell may cover a relatively small geographic area (e.g., a home) and may allow restricted access by UEs 104 having an association with the femto cell (e.g., UEs in a Closed Subscriber Group (CSG) and UEs 104 for users in the home). A BS 102 for a macro cell may be referred to as a macro BS. A BS 102 for a pico cell may be referred to as a pico BS. A BS 102 for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links (e.g., an S1 interface). BSs 102 configured for 5G (e.g., 5G NR or Next Generation RAN (NG-RAN)) may interface with 5GC 130 through second backhaul links 184. BSs 102 may communicate directly or indirectly (e.g., through the EPC 160 or 5GC 130) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs 102, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink (DL) and uplink (UL) (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 130 may include an Access and Mobility Management Function (AMF) 132, other AMFs 133, a Session Management Function (SMF), and a User Plane Function (UPF) 135. AMF 132 may be in communication with a Unified Data Management (UDM) 136.

AMF 132 is generally the control node that processes the signaling between UEs 104 and 5GC 130. Generally, AMF 132 provides QoS flow and session management.

All user Internet protocol (IP) packets are transferred through UPF 135, which is connected to the IP Services 137, and which provides UE IP address allocation as well as other functions for 5GC 130. IP Services 137 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers **232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t***, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}\times15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the BS. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a BS for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of multi-PUSCH scheduling under M-TRP operation in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications by at a user equipment (UE), comprising:

one or more memories comprising instructions; and one or more processors, individually or collectively, configured to execute the instructions to cause the apparatus to:

receive a downlink control information (DCI) that schedules multiple physical uplink shared channels (PUSCHs), wherein the DCI indicates for each individual PUSCH whether that specific PUSCH is scheduled as a single transmission reception points (S-TRP) or multiple TRP (M-TRP) transmission; and transmit each of the PUSCHs to one or more of the TRPs in accordance with information indicated in the DCI.

2. The apparatus of claim 1, wherein the DCI comprises one or more bits that indicate whether the PUSCHs are S-TRP or M-TRP transmissions.

3. The apparatus of claim 2, wherein the one or more bits comprise:

one or more bits, per scheduled PUSCH, that indicate whether that PUSCH is an S-TRP or M-TRP transmission.

4. The apparatus of claim 2, wherein the one or more bits indicate whether all PUSCHs are S-TRP or all PUSCHs are M-TRP transmissions.

5. The apparatus of claim 1, wherein the DCI indicates at least one of:

one or more transmission configuration indicator (TCI) states; or one or more sounding reference signal (SRS) resource indicators (SRIs).

6. The apparatus of claim 5, wherein the one or more TCI states or one or more SRIs are applied to all scheduled PUSCH transmissions.

7. The apparatus of claim 5, wherein:

all PUSCH transmissions are associated with a same TRP; and the DCI indicates a single TCI state or SRI applied to all scheduled PUSCH transmissions.

8. The apparatus of claim 1, wherein the DCI comprises a time domain resource allocation (TDRA) field that indicates time domain resources for the multiple PUSCHs.

9. The apparatus of claim 8, wherein each PUSCH has a separate start and length indicator vector (SLIV), a mapping type, and an offset between a slot in which the DCI is received and the PUSCH is scheduled.

10. The apparatus of claim 9, wherein the DCI also indicates:

a repetition number per PUSCH or a repetition number common to all the PUSCHs.

11. The apparatus of claim 8, wherein the TDRA indicates time domain resources for two PUSCH occasions for a PUSCH scheduled as an M-TRP transmission to two TRPs.

12. The apparatus of claim 1, wherein the DCI comprises a frequency domain resource allocation (FDRA) field applied to all of the scheduled PUSCHs.

13. The apparatus of claim 12, wherein the FDRA indicates frequency domain resources for two PUSCH occasions for a PUSCH scheduled as an M-TRP transmission to two TRPs.

14. The apparatus of claim 1, wherein the DCI indicates one or more demodulation reference signal (DMRS) code division multiplexed (CDM) groups applied to all of the scheduled PUSCHs.

15. The apparatus of claim 1, wherein the DCI indicates at least one of:

a modulation and coding scheme (MCS) to be applied to all the PUSCHs;

a new data indicator (NDI) per PUSCH;

a redundancy version (RV) per PUSCH; or a transmission power control (TPC) command indicated per PUSCH or common to all the PUSCHs.

16. The apparatus of claim 1, wherein the DCI indicates: at least one precoder indication and at least one demodulation reference signal (DMRS) phase tracking reference signal (PTRS) association indication.

17. The apparatus of claim 16, wherein the at least one precoder indication indicates:

at least two transmit precoding transmit precoding matrix indexes (TPMIs) or sounding reference signal (SRS) resource indicators (SRIs) common to all the PUSCHs; or a single TPMI or SRI common to all the PUSCHs.

18. The apparatus of claim 17, wherein the at least one DMRS PTRS association indication comprises:

one DMRS-PTRS association applied to all the PUSCHs, if one TPMI or SRI is indicated; or at least two DMRS-PTRS associations for all the PUSCHs, if at least two TPMIs or SRIs are indicated.

19. An apparatus for wireless communications at a network entity, comprising:

one or more memories comprising instructions; and one or more processors, individually or collectively, configured to execute the instructions to cause the apparatus to:

transmit, to a user equipment (UE), a downlink control information (DCI) that schedules multiple physical uplink shared channels (PUSCHs), wherein the DCI indicates for each individual PUSCH whether that specific PUSCH is scheduled as a single transmission reception points (S-TRP) or multiple TRP (M-TRP) transmission; and receive each of the PUSCHs, via one or more of the TRPs, in accordance with information indicated in the DCI.

20. The apparatus of claim 19, wherein the DCI comprises one or more bits that indicate whether the PUSCHs are S-TRP or M-TRP transmissions.

21. The apparatus of claim 20, wherein the one or more bits comprise:

one or more bits, per scheduled PUSCH, that indicate whether that PUSCH is an S-TRP or M-TRP transmission.

22. The apparatus of claim 20, wherein the one or more bits indicate whether all PUSCHs are S-TRP or all PUSCHs are M-TRP transmissions.

23. The apparatus of claim 19, wherein the DCI indicates at least one of:

one or more transmission configuration indicator (TCI) states; or one or more sounding reference signal (SRS) resource indicators (SRIs).

24. The apparatus of claim 23, wherein the one or more TCI states or one or more SRIs are applied to all scheduled PUSCH transmissions.

25. The apparatus of claim 23, wherein:

all PUSCH transmissions are associated with a same TRP; and the DCI indicates a single TCI state or SRI applied to all scheduled PUSCH transmissions.

26. The apparatus of claim 19, wherein the DCI comprises a time domain resource allocation (TDRA) field that indicates time domain resources for the multiple PUSCHs.

27. A method for wireless communications at a user equipment (UE), comprising:

receiving a downlink control information (DCI) that schedules multiple physical uplink shared channels (PUSCHs), wherein the DCI and indicates for each individual PUSCH whether that specific PUSCH is scheduled as a single transmission reception points (S-TRP) or multiple TRP (M-TRP) transmission; and transmitting each of the PUSCHs to one or more of the TRPs in accordance with information indicated in the DCI.

28. The method of claim 27, wherein the DCI comprises one or more bits that indicate whether the PUSCHs are S-TRP or M-TRP transmissions.

29. A method for wireless communications at a network entity, comprising:

transmitting, to a user equipment (UE), a downlink control information (DCI) that schedules multiple physical uplink shared channels (PUSCHs), wherein the DCI and indicates for each individual PUSCH whether that specific PUSCH is scheduled as a single transmission reception points (S-TRP) or multiple TRP (M-TRP) transmission; and receiving each of the PUSCHs, via one or more of the TRPs, in accordance with information indicated in the DCI.

30. The method of claim 29, wherein the DCI comprises one or more bits that indicate whether the PUSCHs are S-TRP or M-TRP transmissions.

* * * * *